April 18, 1944.    J. LYMAN ET AL    2,346,693
DIRECTIONAL APPARATUS
Filed Nov. 5, 1942    2 Sheets-Sheet 1

INVENTORS:
J. LYMAN
E. NORDEN
BY Paul B. Hunter.
ATTORNEY

April 18, 1944.  J. LYMAN ET AL  2,346,693
DIRECTIONAL APPARATUS
Filed Nov. 5, 1942  2 Sheets-Sheet 2
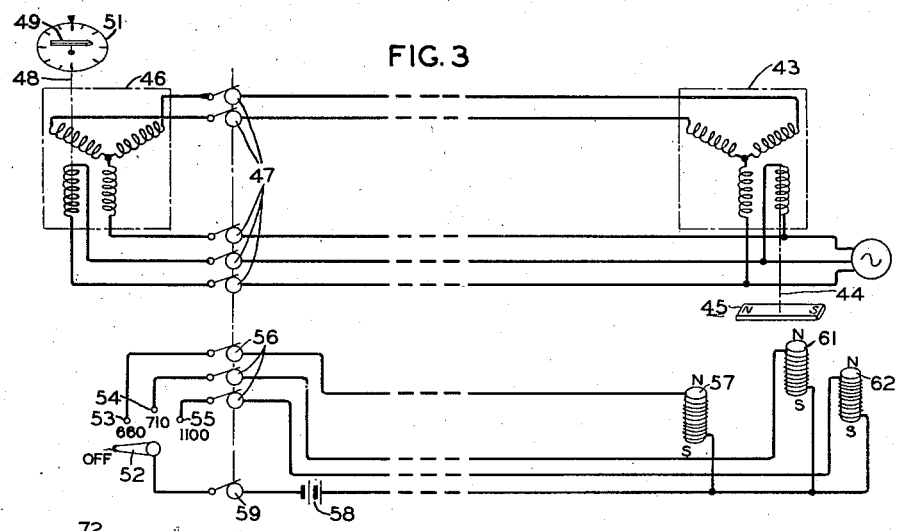
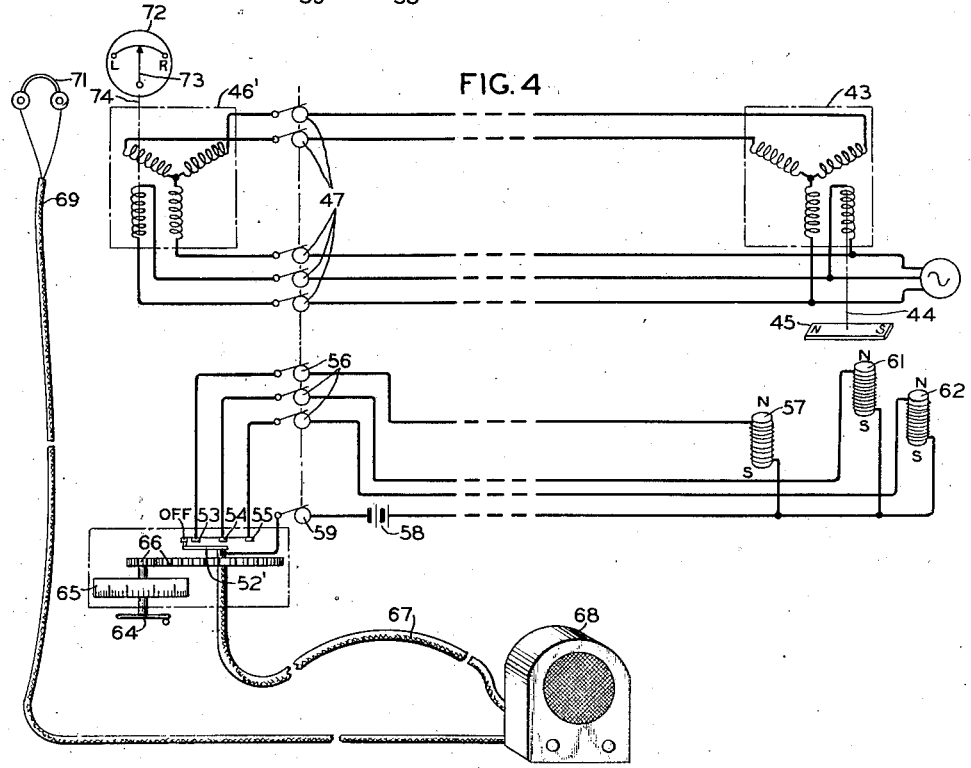
INVENTORS:
J. LYMAN
E. NORDEN
BY
Paul B. Hunter
ATTORNEY Patented Apr. 18, 1944

2,346,693

UNITED STATES PATENT OFFICE 2,346,693

DIRECTIONAL APPARATUS

Joseph Lyman, Huntington, and Elwood Norden, Pelham, N. Y., assignors to Sperry Gyroscope Company, Inc., Brooklyn, N. Y., a corporation of New York Application November 5, 1942, Serial No. 464,623

21 Claims. (Cl. 35—12)

This invention relates to direction finding and more particularly to direction finder apparatus for navigation trainers or the like.

The invention in its preferred embodiment will be described as associated with an aviation trainer of the type disclosed in U. S. Patent to Link No. 2,179,663, wherein the person to be trained or tested is positioned at controls in a simulated aircraft cockpit, and a movable indicating or recording device not observable by him is remotely controlled by azimuthal movements of the cockpit caused by his manipulation of the controls so as to indicate or record on a suitable chart the simulated ground track covered during a training or test period.

As described in the Link patent, in apparatus of this type, a moving recorder marker preferably travels across a calibrated chart at controlled proportionate speeds in the direction or directions selected by the operator at the controls so that the recorder marker is caused to turn exactly in accordance with orientation of the cockpit. Therefore, during the test or training period, the recorder marker is accurately positioned relative to the simulated airport on the chart and represents the exact location of the craft in simulated flight.

In actual flight, while an aircraft is nearing an airport radio station broadcasting directional signals, it is possible to obtain bearings assisting landing by tuning a radio compass in the aircraft successively to any available radio stations of known location in the vicinity and noting their relative directions. These stations may be airport range stations or the usual high power commercial stations. This is especially important in blind flying. The present invention is primarily designed to simulate such actual flight conditions in training apparatus by introducing thereinto such simulated radio stations.

With the above in mind, it is a major object of the invention to provide navigation training apparatus or the like having novel arrangements for simulating substantially all usual and actual navigation conditions whereby simulated auxiliary bearings may be taken during said simulated navigation.

A further object of the invention is to provide novel navigation training apparatus or the like wherein a remotely controlled recorder or indicator is employed to actuate a simulated radio compass or like directional instrument observable during the training or test period by the individual being trained or tested.

It is a further object of the invention to provide a novel navigation or like training apparatus wherein a remotely controlled simulated navigation path recorder apparatus is provided with simulated directional reference points of known location relative to a simulated destination for approximating actual navigation conditions, and includes a member or members responsive to signals from said reference points with provisions for causing said member or members to energize a simulated radio compass or like direction indicator observable during the training or test period by the individual being trained or tested.

A further object of the invention is to provide aviation training apparatus or the like of the type in which an operator to be trained or tested is positioned at simulated aircraft controls and a recorder part is actuated through remote control in accordance with azimuthal movements of the simulated aircraft, wherein the movable recorder part carries a shiftable element responsive to selectively available localized signals of simulated known reference points and mechanism is provided for transmitting motion of said element back to a radio compass or like directional instrument observable by said operator. Preferably the reference points simulate radio stations of known location, and are selectively energized by a simulated tuning operation by said operator during the simulated flight period.

A further object of the invention is to provide novel bearing finding arrangements in aviation training apparatus or the like wherein a plurality of selectively energized simulated radio stations of known location may be introduced thereinto to actuate suitable direction indicating apparatus.

A further object of the invention is to provide a recorder assembly of novel construction for use in navigation training and like apparatus.

Further objects of the invention will presently appear as the description proceeds in connection with the appended claims and the annexed drawings wherein:

Fig. 3 is an electrical circuit diagram of the direction indicator system of Fig. 1.

Fig. 4 illustrates a further embodiment of the invention wherein actual programs from known location radio stations are actually introduced to the operator to more closely approximate actual navigating conditions in the general system of Fig. 1.

Figure 1:
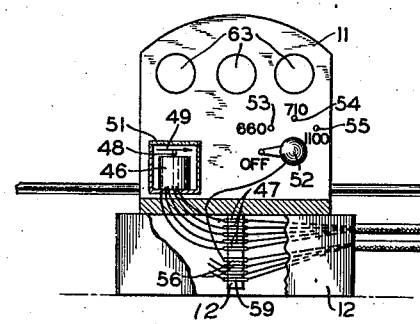
Fig. 1 is a substantially diagrammatic representation of apparatus according to a preferred embodiment of the invention illustrating the remote control direction indicator arrangements.

Referring to Fig. 1, a fixed instrument board 11 is provided for observation by the operator in a simulated aeroplane cockpit (not otherwise shown) mounted for azimuthal rotation about the axis of a normally vertical shaft 12 which depends from and rotates with the cockpit.

The cockpit is remote from an instructor's table 13 on the horizontal flat top surface of which rests a chart 14 graduated similarly to that illustrated in the above-identified Link patent. Concentric circles 15 are spaced proportional to the selected simulated ground speed of the craft for the training period, while sectors 16 represent directional beams emitted by a simulated airport radio transmitter at the center of the concentric circles.

A recording member 17, hereinafter called a crab to adopt terminology common to this art, is supported on the top surface of chart 14 by at least two spaced drive wheels 18 and an inked marker wheel 19. A synchronous receiver 21, preferably of the Selsyn type, is supported on the crab and has a vertical motor shaft 22 on which are fixed pinions 23 and 24. Pinion 23 is meshed with a pair of spaced gears 25 on rotatable vertical shafts 26, and drive wheels 18 are rotatably supported on horizontal axes in brackets 27 fixed on the lower ends of shafts 26. Synchro-receiver 21 is electrically connected through cable 28 to a similar type synchro-transmitter (not shown) geared to shaft 12 so that the azimuthal movements of the cockpit are reflected instantaneously into identical turning movements of shafts 26 to thereby control orientation of drive wheels 18. Brackets 27 also carry small electric motors (not shown) driving drive wheels 18 through gears 29 to cause the crab to travel across the chart at a speed proportionate to the simulated flight speed as shown in said Link patent. Power to these small motors is delivered from a suitable source through stationary slip rings 31 and suitable brushes.

It will be understood that at least two drive wheels such as 18 are supplied for supporting the crab as shown in said Link patent, each being driven and oriented as above described. Since the above-mentioned manner of controlling movement of the crab is disclosed in detail in and may be ascertained from the Link patent, further description herein is deemed unnecessary.

Orientation of marking wheel 19 in exact synchronism with orientation of drive wheels 18 is obtained through the drive system comprising pinion 24, gear 32, shaft 33, gears 34 and 35, shaft 36, gears 37 and 38, and rotatable vertical shaft 39. Wheel 19 is freely rotatably mounted about a horizontal axis on the lower end of shaft 39 and tracks parallel to drive wheels 18 as the latter are positively oriented. The drive system below shaft 33 is supported in a removable housing 41.

Within housing 41 is a rigid bracket 42 to which is fixed a synchro-transmitter 43, preferably of the Selsyn type, having its rotor carried by extremely low-friction jeweled bearings so that it is substantially without friction. Rotor shaft 44 is vertically disposed and carries a relatively long lightweight magnetic needle 45 having north and south poles as indicated. The axis of shaft 44 is exactly aligned with that of marker wheel shaft 39, and the center of rotor shaft 44 is disposed directly above the simulated position of the craft in flight as indicated by the point of contact between wheel 19 and chart 14.

Synchro-transmitter 43 is connected with a synchro-receiver 46 of the same type preferably attached to instrument board 11 through the five leads shown extending through cable 28. As shown in Figs. 1 and 3, suitable slip ring and brush assemblies designated at 47 on shaft 12 insure unbroken circuits through the leads during turning movements of the cockpit.

As further shown in Figs. 1 and 3, the rotor shaft 48 of receiver 46 is vertical and carries a horizontal pointer 49 cooperating with a horizontal azimuthal scale 51 simulating the usual radio compass azimuthal scale. We find this horizontal scale to be especially advantageous in flight trainers as it is in full view of the operator, but such is not essential to practice of the invention.

A switch blade 52 is mounted on board 11 within reach of the operator for rotation to contact any of a plurality of terminals 53—55. Preferably the switch blade moves over a radio compass tuning dial of usual type which is graduated and marked in kilocycles, and the terminals 53—55 are located at points along the dial corresponding to the wavelengths of selected known radio stations in the vicinity of the simulated airport for reasons which will presently appear.

Terminal 53 is connected by a lead through a suitable slip ring and brush assembly 56 on shaft 12 to an electromagnet 57, and a return lead through battery 58 and suitable slip ring and brush assembly 59 is connected to blade 52, whereby magnet 57 is energized when blade 52 contacts terminal 53. Cable 60 contains these leads. Similarly, when blade 52 contacts terminals 54 and 55, electromagnets 61 and 62, respectively, are energized by battery 58. Electromagnets 57, 61 and 62 are mounted vertically on table 13, preferably below different quadrants of chart 14, with each north pole disposed at the top so as to be close to the chart.

The locations of magnets 57, 61 and 62 are chosen if possible to represent accurately the simulated positions of actual radio stations of known location in the vicinity of the simulated airport, according to the proportionate scale of chart 14. If no such actual stations are available for a particular airport, arbitrarily selected locations for the magnets may be chosen to simulate desired conditions for training purposes.

The strength of the magnetic fields from the electromagnets should be sufficient to overcome any effect of the earth's magnetic field or other unwanted magnetic disturbances in the vicinity, and if necessary the apparatus can be installed in a magnetically shielded room. The magnetic fields must also be at least of sufficient strength to properly influence the magnetic needle for all possible positions of the crab on the chart. We have found that by varying the power delivered to any electromagnet, corresponding to the distance of the crab from the simulated stations, errors in direction measuring similar to those encountered during actual navigation conditions may be simulated, thereby further training the operator to handle actual conditions.

Board 11 carries a plurality of other usual trainer instruments 63 for indicating simulated flight conditions. Any necessary electrical connections to these instruments from the crab are made through cable 28 and suitable additional slip ring and brush assemblies on shaft 12, but since these are not essential to understanding of the present invention no further disclosure thereof is necessary.

An operator to be trained or tested is installed in the cockpit which is preferably hooded over to simulate blind flying conditions, and his manipulation of the usual controls effects directional control of the crab during its movement over the char..

Prior to the present invention, after the instructor arbitrarily located the crab as usual in any quadrant of the chart to start the training period, the operator, although receiving directional signals from the simulated airport radio station, was unable to determine his location relative to the airport except by initially starting out in a chosen direction and noting whether the airport signals became stronger or weaker. According to the present invention the operator is enabled to determine or check his location by reference to simulated radio stations in the vicinity.

In determining this location the operator, preferably after establishing a simulated flight path in the usual manner to accurately locate his simulated position on the chart, manipulates a standard radio compass knob to turn blade 52 to contact terminal 53, thereby simulating tuning a radio compass to a station of 660 kilocycles, but actually energizing magnet 57 which is simulatively, accurately and properly located relative to the airport radio station at the center of the chart. In actual flying, the actual location of the station transmitter need be known, but in simulated flight any arbitrary location may obviously be selected.

As soon as magnet 57 is energized, its nearby north pole attracts the south pole of magnetic needle 45 which instantaneously swings into alignment pointing at the magnet. The needle movement is transmitted through the servo system comprising the synchro-transmitter and -receiver assembly to identically displace compass needle 49 whereby an instant indication of the relative direction of the simulated radio station from the simulated current flight position of the craft is given to the operator observing radio compass scale 51.

In like manner a second relative direction of another station of known location tuning in at 710 kilocycles may be obtained by rotating blade 52 to contact terminal 54 thereby deenergizing magnet 57 and energizing electromagnet 61 which now attracts the south pole of needle 44. Motion of needle 44 is again transmitted by the servo system to actuate needle 49 to indicate a new direction on simulated radio compass scale 51. If necessary, a third relative direction may similarly be ascertained by energizing electromagnet 62, but only two such findings are necessary to determine location, as the operator may readily determine from a properly scaled map marked with the actual relative positions of said known location stations (one of which may be the airport station) his exact current location, which would be at the intersection of straight lines drawn on the map through the marked radio station positions and in the determined directions. A rough approximation of location, depending in accuracy upon experience, may of course be made mentally without taking the time to actually draw such straight lines.

The operator then proceeds to complete his training period in the usual manner, with the above described arrangements available at any time, as in actual flight, for checking or locating his position.

As exemplary of preferred practice we have illustrated the servo transmitter herein as mounted on an automatically shiftable crab, but it is obvious that the invention is of sufficient scope to embrace as well installations wherein the transmitter is relatively stationary or only manually shiftable, as such may be sufficient for many training purposes.

While we prefer to employ electrical servo mechanism for relaying directional information back to the operator from the recorder, the invention contemplates the use of any equivalent mechanism or means for this purpose.

Further, instead of using several fixed location magnets as in Fig. 1, the invention contemplates the use of a simple shiftably mounted electromagnet mounted to be selectively moved to any of the simulated radio station locations of known location upon simulated tuning, since only one magnet at a time may be energized in any event.

In the embodiment illustrated in Fig. 4, further actual flying conditions are simulated. Instead of a dial compass knob turning switch blade 52, the operator manipulates a knob 64 for rotating a dial 65 connected by gearing 66 and a suitable motion transmitting device such as a Bowden cable 67 to the tuning mechanism of an ordinary radio receiver 68. Dial 65 is calibrated in kilocycles in accordance with the dial of receiver 68. The audio output of receiver 68 is connected by cable 69 to the usual headphones 71 worn by the operator instead of the loud speaker. Receiver 68 may be actually mounted on table 13 if desired. Gearing 66 also rotates a switch blade 52' functioning like blade 52.

Fig. 4 also illustrates a simulated usual left-right indicator 72 having a vertically disposed dial over which moves a pointer 73 fixed to the horizontal rotor shaft 74 of a synchro-receiver 46' which is otherwise the same as synchro-receiver 46.

Figure 2:
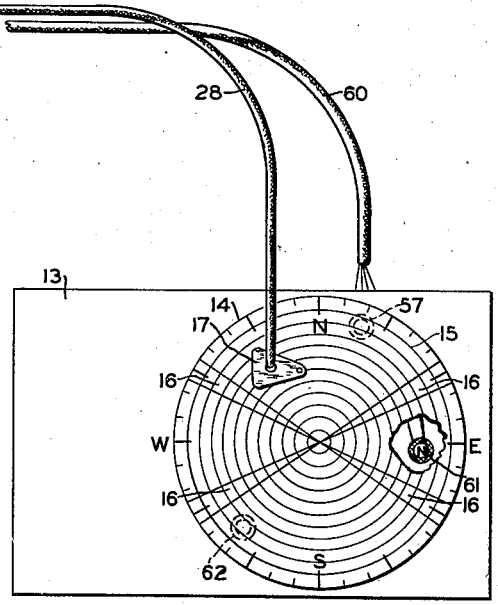
Fig. 2 is an enlarged partly sectional side elevation of a shiftable recorder member, illustrating especially a preferred direction responsive device.
Figure 2:
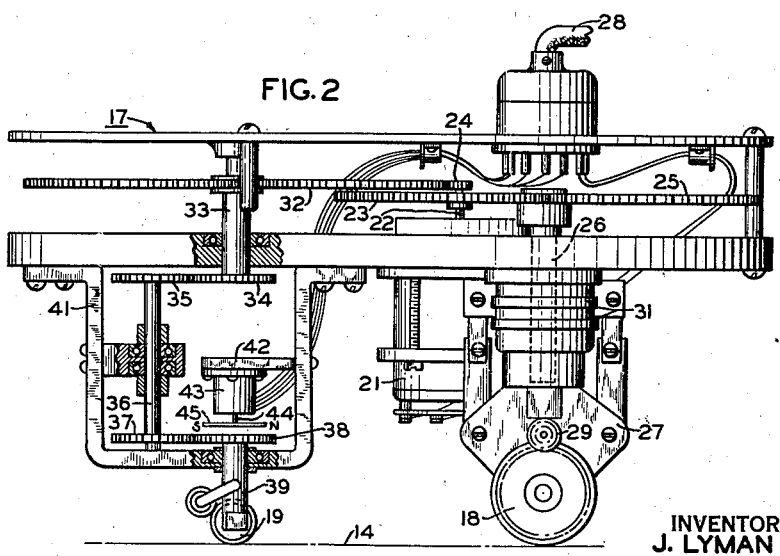

The apparatus of Fig. 4 obviously functions similarly to that of Figs. 1–3 above described, except that when the operator actually tunes to a radio station he hears the actual program therefrom, thereby simulating flight conditions exactly.

It will be understood that the meters at 51 and 72 or any equivalent direction indicators may be interchanged between the apparatus of Figs. 1–3 and 4. Also, the receiver 68 and accompanying tuning arrangements may be used in the system of Fig. 3 without departure from the spirit of the invention.

Our invention therefore improves the training or testing available in the usual training apparatus by introducing more closely simulated actual navigation conditions, and simulating actual radio compass operation. The invention is not limited to aircraft, as obviously it may be employed to training for tank, ship or any similar navigation wherein such check bearings are usually made.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In a ground apparatus for teaching the art of navigation, location signaling means, direction responsive means controlled by said signaling means, and indicating means actuated by said direction responsive means.

2. In the apparatus defined in claim 1, means for selectively actuating said direction responsive means.

3. In a ground apparatus for teaching the art of navigation wherein an operator is positioned at controls capable of simulating orientation of a navigable craft relative to a selected path, direction responsive means remote from said controls, a direction indicator observable by the operator at the controls, and means connecting said direction responsive means to actuate said direction indicator so that said operator may be informed of the simulated position of his craft in said selected path.

4. In a ground apparatus for teaching the art of aerial navigation wherein an operator is stationed at controls capable of simulating orientation of a craft relative to a selected path, direction responsive means operably connected to said controls and positioned in accordance with the simulated direction of said craft as determined by actuation of said controls, a direction indicator observable to said operator at the controls, and means connecting said direction responsive means to actuate said direction indicator so that said operator may be informed of the simulated position of said craft relative to said path.

5. In the apparatus defined in claim 3, means for simulating a radio station of known location, movable means in said direction responsive means capable of orientation with said station at any point in said simulated path, and servo means interconnecting said movable means and said direction indicator.

6. In a ground apparatus for teaching the art of navigation wherein an operator is positioned at simulated controls, a direction indicator, a chart simulating a navigation area and a record tracer oriented in response to said controls and movable over said chart to record said simulated navigation path, means for simulating a station of known location in said area, cooperating means at said station and record tracer for determining the relative direction of said station from any simulated position of the craft, and means connecting said cooperating means with said direction indicator.

7. In a ground apparatus for teaching the art of navigation wherein an operator is positioned at simulated controls connected to actuate a member in accordance with a simulated navigational operation, a signal source adjacent said member simulating a station of known location selectively energizable by said operator, and means including direction determining means at the station and member for indicating to said operator at the controls his simulated location relative to said station.

8. In a ground apparatus for teaching the art of navigation wherein an operator is positioned at simulated controls connected to actuate a member in accordance with a simulated navigation path, a signal source adjacent said member selectively energizable by said operator, a direction indicator observable by said operator at the controls, a movable element at said member oriented by said energized source according to the location of said member relative to the source, and means transmitting motion of said element to said indicator.

9. In the apparatus defined in claim 8, said last-named means comprising servo means including a transmitter connected to said element and a receiver at the controls for actuating said indicator.

10. In a ground apparatus for teaching the art of navigation wherein an operator is positioned at simulated controls which are connected to actuate a movable recorder member adapted to make a record of the simulated navigation path, a reference signal source in said apparatus simulating a radio station of known location, means controllable by said operator for selectively energizing said signal source, means mounted to move with said movable recorder member automatically oriented according to the direction of said member relative to said energized signal source, and indicating means sensible to said operator at the controls informing said operator as to the simulated relative location of said apparatus with respect to said simulated radio station during the simulated navigation period.

11. In the apparatus defined in claim 10, said reference signal source comprising an electromagnet, and said oriented means comprising a permanent magnet mounted for free rotation.

12. In the apparatus defined in claim 10, said reference signal source comprising an electromagnet and said oriented means comprising a freely rotatable permanent magnet connected to the transmitter of a servo system, and a receiver for said servo system mounted in the apparatus for actuating said indicating means.

13. In the apparatus defined in claim 10, a plurality of said reference signal sources in said apparatus simulating spaced radio stations of known location, and means controlled by said operator for selectively energizing any of said sources.

14. In the apparatus defined in claim 10, said indicating means comprising a simulated radio compass or like visual directional meter.

15. Recording and indicating apparatus for a ground device by which the art of navigation is taught, comprising a chart simulating an area adjacent a simulated airport radio station, a plurality of electromagnets beneath said chart spaced to represent simulated radio stations of known location adjacent said area, a recorder member movable over said chart, a remotely positioned movably mounted craft having controls for simulating flight conditions, means for orienting said recorder member in accord with azimuthal orientation of said craft, means in said craft for selectively energizing any of said electromagnets, means movable with said recorder member automatically oriented according to the location of an energized electromagnet, and an indicator at said craft, responsive to orientation of said movable means.

16. Recording and indicating apparatus for a ground device by which the art of navigation is taught, comprising a shiftable recorder member adapted to be moved by manipulation of a remote set of controls, a signal magnet, a Selsyn type impulse transmitter mounted to move with said member, a magnetic needle mounted on the rotor of said transmitter, said needle being responsive to energization of said magnet to indicate the direction thereof relative to said member, an indicator, and means actuating said indicator comprising a Selsyn type receiver motor connected to said transmitter.

17. In recording apparatus for direction finders and the like, a shiftable member adapted to move over a chart to record the azimuthal movement of a training craft, a marker on said member adapted to trace said movement on the chart, and a magnetic needle rotatable about an axis aligned with said marker, means for positioning said needle, and direction indicating means at the craft controlled by said needle.

18. In recording apparatus for direction finders and the like, a table supporting a horizontal chart, a recorder member movable over the surface of said chart and having a marker adapted to trace said movement on the chart, a synchro-transmitter movable with said member and having a rotor carrying a magnetic needle, and a signal source of magnetic energy adjacent said table having a predetermined location relative to reference points on the chart, said source being of sufficient strength to control orientation of said needle, a training craft for controlling said recorder member, and direction indicating means at the craft controlled by said synchro-transmitter.

19. The apparatus defined in claim 17, in which the axis of the magnetic needle is vertically disposed.

20. The apparatus defined in claim 17, in which the magnetic needle is mounted on the rotor shaft of a synchro-transmitter.

21. A stationary trainer device for teaching a student in flying radio beam patterns, said device comprising a simulated compass visible to the student, a tracing unit remote from the student, said unit having chart marking means and means for propelling the tracing unit on a chart including a layout of a radio beam pattern thereon at an assumed forward speed of said trainer device, control means operable at will of the student for changing the heading of said tracing unit on the chart, means coupling said simulated compass to said tracing unit for changing the reading of said compass in accordance with changes in heading of said tracing unit for indicating to the student simulated changes in heading of said trainer device, and means operable for transmitting to the student signals simulating radio signals broadcast to an aeroplane in actual flight.

JOSEPH LYMAN.
ELWOOD NORDEN.

Disclaimer 2,346,693.—*Joseph Lyman*, Huntington, and *Elwood Norden*, Pelham, N. Y. DIRECTIONAL APPARATUS. Patent dated Apr. 18, 1944. Disclaimer filed Dec. 9, 1947, by the assignee, *Sperry Gyroscope Company, Inc.*

Hereby enters this disclaimer to claims 3, 4, 6, 7, and 21 of the specification of said patent.

[*Official Gazette January 13, 1948.*]